United States Patent [19]

Amburn

[11] 4,239,010
[45] Dec. 16, 1980

[54] MICROWAVE SEED SENSOR FOR FIELD SEED PLANTER

[75] Inventor: Raymond D. Amburn, Sterling Heights, Mich.

[73] Assignee: Dickey-john Corporation, Auburn, Ill.

[21] Appl. No.: 53,556

[22] Filed: Jun. 29, 1979

Related U.S. Application Data

[63] Continuation-in-part of Ser. No. 750,309, Dec. 13, 1976, abandoned, which is a continuation-in-part of Ser. No. 737,298, Nov. 1, 1976, abandoned.

[51] Int. Cl.³ .......................... A01C 1/00; A01G 7/04; G08B 21/00
[52] U.S. Cl. ........................................... 111/1; 47/1.3; 324/58.5 A; 324/58.5 B; 340/684; 343/5 DD; 343/5 TM; 343/18 A
[58] Field of Search .......... 111/1, 34; 47/1.3, DIG. 9, 47/DIG. 10; 324/58.5 A, 58.5 B, 58.5 C, 58.5 R; 250/223 R, 568; 235/92 PK; 340/684; 343/18 A, 5 DD, 5 TM

[56] References Cited

U.S. PATENT DOCUMENTS

| | | | |
|---|---|---|---|
| 2,649,538 | 8/1953 | Marlowe et al. | 340/258 B |
| 2,675,942 | 4/1954 | Vogelsang | 47/DIG. 9 |
| 3,181,150 | 4/1965 | Ruppersberg et al. | 343/7 VC |
| 3,435,950 | 4/1969 | Suvekrop | 209/111.5 X |
| 3,460,492 | 8/1969 | Dickinson et al. | 111/1 |
| 3,530,372 | 9/1970 | Laukien | 209/111.5 X |
| 3,535,629 | 10/1970 | Gibson et al. | 324/58.5 A |
| 3,537,091 | 10/1970 | Schenkenberg | 111/1 X |
| 3,675,367 | 7/1972 | Amburn | 47/1.3 |
| 3,691,556 | 9/1972 | Bloice | 340/258 B |
| 3,765,125 | 10/1973 | Amburn | 47/1.3 |
| 3,786,330 | 1/1974 | Inoue et al. | 324/58.5 B |
| 3,855,953 | 12/1974 | Fathauer et al. | 111/1 X |
| 3,881,353 | 5/1975 | Fathauer | 73/194 A |
| 3,883,798 | 5/1975 | Free | 324/58.5 C |
| 3,912,121 | 10/1975 | Steffen | 111/1 X |
| 3,927,400 | 12/1975 | Knepler | 111/1 X |
| 3,928,751 | 12/1975 | Fathauer | 235/92 PK |
| 3,940,885 | 3/1976 | Gray | 47/1.3 X |
| 3,976,030 | 8/1976 | Ragsdale | 111/1 X |
| 3,992,611 | 11/1976 | Henry | 111/1 X |
| 4,027,384 | 6/1977 | Connolly et al. | 29/600 X |
| 4,054,779 | 10/1977 | Wilke | 235/92 PK |
| 4,091,385 | 5/1978 | Petlevich et al. | 343/8 |
| 4,092,800 | 6/1978 | Wayland et al. | 47/DIG. 10 |
| 4,149,163 | 4/1979 | Fathauer | 340/684 |

FOREIGN PATENT DOCUMENTS

| | | | |
|---|---|---|---|
| 1003042 | 1/1977 | Canada | 47/1.3 |
| 1523215 | 10/1969 | Fed. Rep. of Germany | 324/58.5 |
| 621242 | 4/1949 | United Kingdom | 47/DIG. 9 |

OTHER PUBLICATIONS

Coultas, F. W., (1972), "Non-Contacting Measurements Using Mini-Radars", *The Sert Journal*, vol. 6, No. 4, pp. 92-96, Jul. 1972.

Hrubesh, L. W., (1974), "A Simplified Microwave Instrument for Measuring Particale Volumes and Densities", *Rev. Sci. Instrum.*, vol. 45, No. 1, Jan. 1974, pp. 125, 126.

*Primary Examiner*—Edgar S. Burr
*Assistant Examiner*—James R. Feyrer
*Attorney, Agent, or Firm*—Trexler, Wolters, Bushnell & Fosse, Ltd.

[57] ABSTRACT

A seed planting apparatus comprises a mobile planting machine to be connected to a tractor or similar vehicle, and having a seed hopper for containing a supply of seeds to be planted. A seed outlet on the hopper feeds a seed dispensing apparatus for delivering seeds to the ground to be planted. A microwave seed sensing apparatus is disposed in a path of travel for seeds discharged from the hopper for detecting the seeds and producing an observable indication to the operator of the presence of seeds in the path of travel. The seed planting apparatus may also include magnetic seed treatment apparatus. The microwave sensing apparatus may therefore be connected in a control circuit for actuating the magnetic field in response to the presence of seeds and for producing an indication to an operator of the passage of seeds.

10 Claims, 8 Drawing Figures

MICROWAVE SEED SENSOR FOR FIELD SEED PLANTER

CROSS REFERENCE TO RELATED APPLICATIONS

This application is a continuation-in-part of application Ser. No. 750,309 filed Dec. 13, 1976, now abandoned, and entitled "Magnetic Seed Planter", which is a continuation-in-part of application Ser. No. 737,298 filed Nov. 1, 1976, now abandoned, and entitled "Magnetic Seed Planter".

FIELD OF THE INVENTION

This invention relates generally to seed planters, and is particularly concerned with planters having a microwave seed sensing device thereon for sensing seeds as they are delivered by the seed planter to be planted.

BACKGROUND OF THE INVENTION

A number of seed sensors for use in field seed planting apparatus are known in the prior art. Briefly, these sensors fall into two major categories: mechanical and photo-sensitive type sensors. The former, mechanical sensors generally utilize a highly sensitive mechanical switch interposed in a conduit in the path of travel of seeds being dispensed by the planter, so as to the "tripped" by each seed passing through this conduit. The latter, photo-sensitive type sensors generally include a light source photo-sensitive element mounted generally in facing, opposed relation in the seed conduit, such that passage of a seed through the conduit interrupts the light beam falling from the photo-sensitive element, with a corresponding pulse output.

While the sensors, and particularly the latter type have proven useful and highly reliable in operation, certain problems have nonetheless been encountered in their use. One such problem is the accumulation of dirt, dust and the like within the conduits and in particular around the mechanical switch elements or photo-sensitive elements of the sensors. In the former case the moving part of the switch element may tend to become dirt-encrusted, corroded, or otherwise disturbed, such that their performance suffers. In the case of the photo-sensitive elements, obscuring of the light source or of the photo-sensitive element or both results in a loss of sensitivity in the system, and in extreme cases failure thereof. Moreover, insecticide substances commonly used to coat corn seeds or the like, often be deposited on the inside walls of the conduit, thus further obscuring the surfaces of both light source and photo-sensitive detector.

Modern field planters commonly plant from twelve to as many as twenty-four rows of seeds simultaneously. Accordingly, if all planting chutes are to be monitored, one sensor must be provided for each. The provision of such a large number of sensors has heretofore required considerable redundancy in the circuitry associated with the sensors, if it is desired to simultaneously monitor the passage of seeds through all of the seed chutes whose associated rows are being planted. This is generally been true since the response time of either the mechanical or photo-sensitive elements is generally not rapid enough to permit multiplex scanning at a high enough rate to assure substantially continuous monitoring of all sensors.

Advantageously, microwave sensor in accordance with the present invention provides solutions to both of these problems. Specifically, the effect of dirt, dust or insecticide coating is considerably less significant in a microwave system because the wave length of the radiation is many orders of magnitude greater than that of visable light, whose wave length corresponds roughly to the size of particles of dirt, dust or insecticide, which thereby tend to produce scattering or confusion of visable light. This effect is much less pronounced with microwave radiation. Moreover, microwave video detectors are capable of a response time up to four orders of magnitude greater than that of presently available photo-sensitive devices. As an additional element, a microwave apparatus requires but a single cable be feed to the sensor, as the sensing is based upon a field disturbance by the passage of the seed which is passed back through the same transmission line used to bring the microwave signal into the seed conduit for sensing the seed. In contrast, a photo sensor system requires two cables, one for the light or illumination source and another for the photo-sensitive detector element.

Other objects, advantages and features of the invention will become apparent from the following detailed description of the illustrated embodiment, taken in connection with the accompanying drawings.

OBJECTS AND SUMMARY OF THE INVENTION

Accordingly, it is an object of this invention to provide new and improved seed planting apparatus including a microwave seed sensor for detecting the passage of seeds therethrough to be planted by microwave radiation.

A related object of this invention is to provide a new and improved seed planting apparatus in accordance with the foregoing object, further adapted to induce magnetism into seeds during the planting operation and prior to the delivery of seeds to the ground to be planted.

Another object of this invention is to provide a new and improved seed planting apparatus in accordance with the foregoing objects, further adapted to control the inducing of magnetism into the seeds in accordance with the detection of the seeds by microwave radiation.

Briefly, and in accordance with the foregoing objects, in a seed planter, there is provided the combination comprising: seed delivery conduit means for delivering seeds to the ground to be planted, and microwave sensor means comprising means forming a path of travel for seeds interposed in said conduit means, means for providing microwave energy in a predetermined portion of said path of travel, means for substantially confining said microwave energy to said predetermined portion of said path of travel so as to sense the presence or absence of seeds in said predetermined portion of said path of travel.

DETAILED DESCRIPTION OF THE ILLUSTRATED EMBODIMENT

Figure 1:
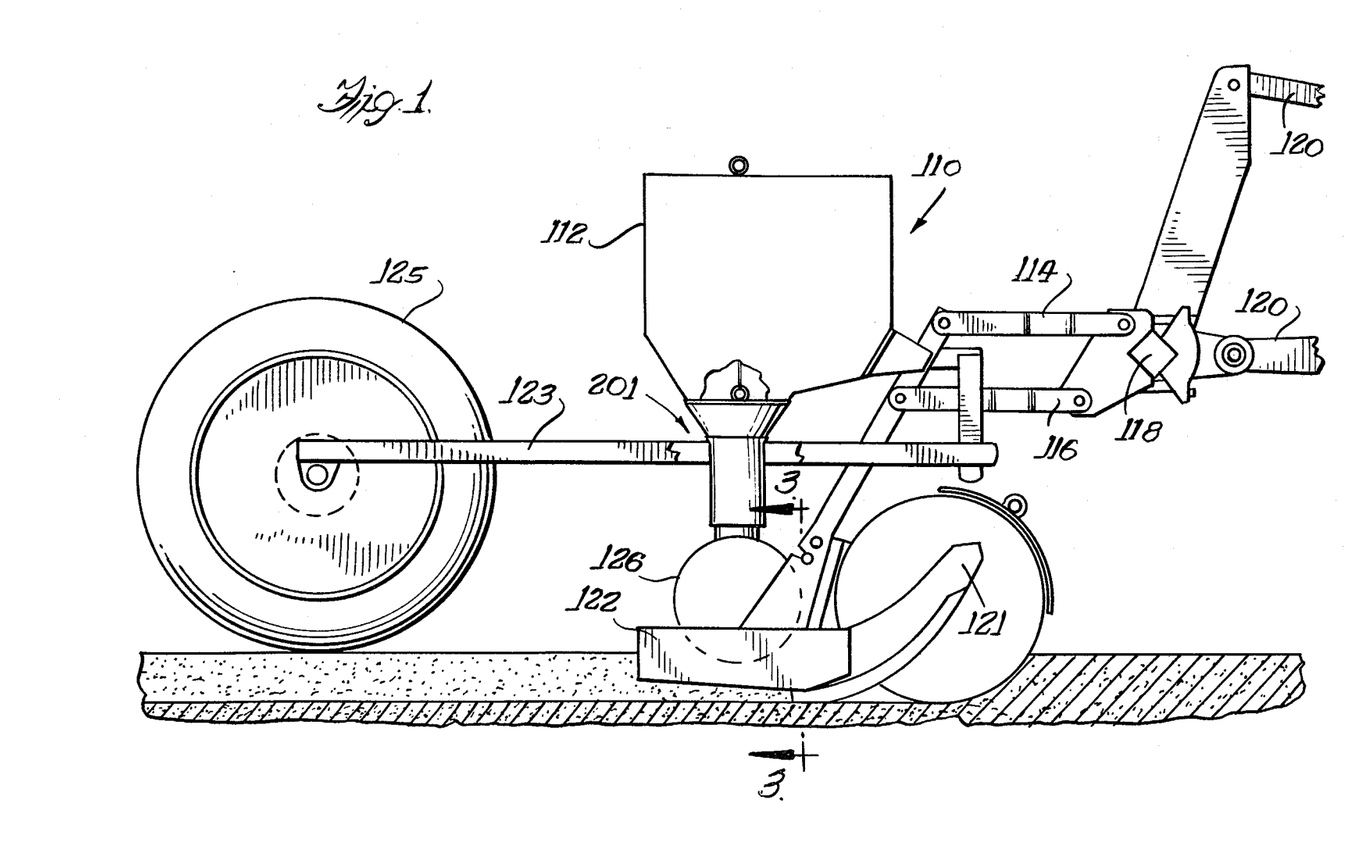
FIG. 1 is a side elevation of a seed planter embodying the invention.

In FIG. 1, the magnetic seed planter is designated collectively by reference numeral 110. The magnetic seed planter 110 includes a hopper 112 supported on link members 114 and 116. Link members 114 and 116 are secured to a tool bar 118. The tool bar 118 is connected with the rear draft links 120 of a tractor (not shown).

Figure 3:
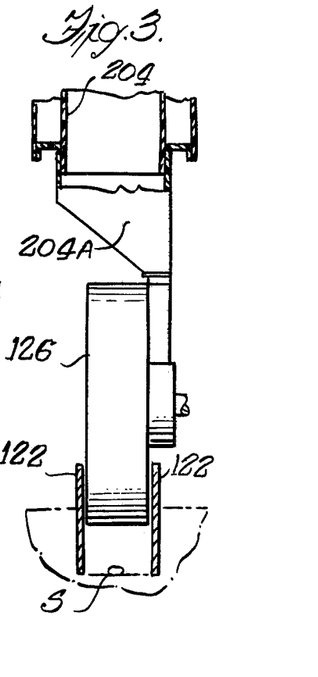
FIG. 3 is a sectional view taken approximately on lines 3—3 of FIG. 1.

Disposed beneath the hopper 112 in engagement with the ground is a furrow opening member 121 havng diverging blades 122 (FIG. 3). As the furrow opening member 121 advances toward the right, as viewed in FIG. 1, to open a furrow, seeds S are deposited in the furrow. A press wheel 125 rotatably mounted on the end of a draw bar 123 closes the furrow over the seeds in a conventional manner.

Received between the blades 122 is a seed dispensing mechanism 126. The seed dispensing mechanism 126 may be of the type disclosed in U.S. Pat. Nos. 3,347,426 and 3,434,437, for example. The seed dispensing device 126 dispenses seeds at a selected rate as the planter advances over the ground. The specific construction of the seed metering and dispensing mechanism 126 forms no part of the present invention.

The seed dispensing mechanism 126 may be rotatably mounted on the planter and interconnected through chain drives or the like with the press wheel 125 such that rotation of the press wheel causes rotation of the seed dispensing mechanism 126. Again, reference may be had to U.S. Pat. Nos. 3,347,426 and 3,434,437 for a suitable chain drive connection between the seed dispensing mechanism and the press wheel 125.

Figure 2:
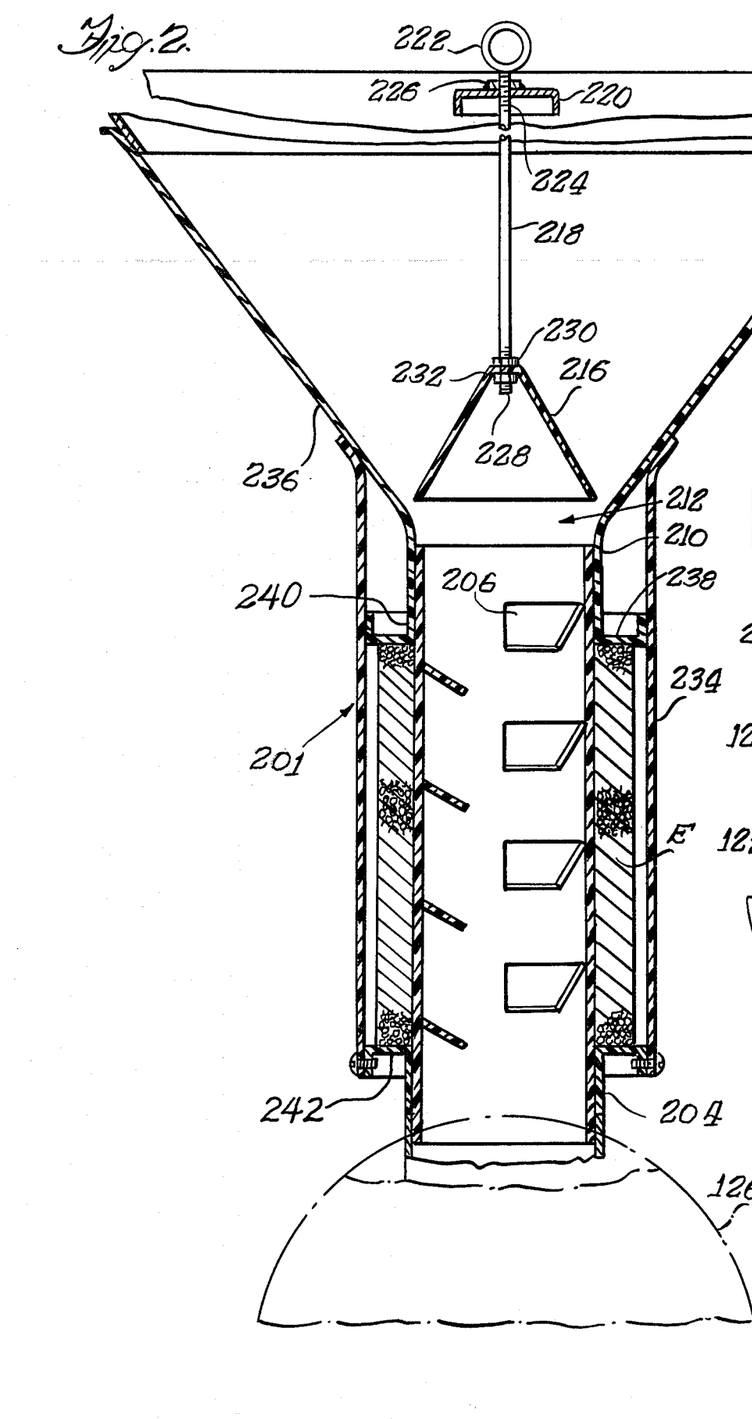
FIG. 2 is an enlarged sectional view of a magnetic seed treating means associated with the seed planter of FIG. 1.

A magnetic seed treating apparatus is shown in detail in FIG. 2, and is collectively designated by reference numeral 201 and comprises an electromagnet E mounted on a tubular conduit 204 of plastic or other relatively non-magnetic material. A plurality of deflecting elements in the form of stationary baffles designated by reference numeral 206 are mounted in the tubular conduit within the field of the magnet E. The deflecting elements or baffles 206 are each comprised of plastic or other relatively non-magnetic material, and are inclined downwardly and inwardly toward the center of the tube 204. Each of the baffles has one end mounted in the wall of the tube 204.

The baffles 206 are successively axially spaced along the length of the tube, and each projects downwardly and inwardly from the wall of tube 204 toward the longitudinal axis of tube 204 to cause seeds falling through the tube to move in a tortuous path through the conduit 204 to control the rate of movement of seeds through the conduit, and hence the exposure time to the magnetic field.

Mounted on the tubular conduit 204 is the feed hopper 208 having a hollow, cylindrical mounting portion 210 telescopically mounted on one end of the tubular conduit 204 and defining a feed opening 212 from the hopper 208 into the end of tube 204. The hopper 208 has a wall portion 214 extending outwardly from the mounting portion 210 in a funnel-like manner.

The rate of flow of seeds from the hopper 208 into the upper end of tube 204 is controlled by a seed metering member 216 carried at one end of a rod 218 mounted on a cross bar 220. The cross bar 220 extends diametrically across the hopper 12 with its opposite end secured in a conventional manner to opposite surfaces of the wall of hopper 12. Rod 218 is adjustably mounted in the cross bar 220 and is formed at its upper end with an eyelet 222. Rod 218 is threaded at 224 adjacent the eyelet 222 for adjustment relative to a nut 226 secured to the upper surface of the cross bar 220. The lower end of the rod is threaded as shown at 228 for threaded engagement with nuts 230 and 232 for adjustably securing the metering member 216 relative to the feed opening 212. The metering member 216 is in the form of a conical, hollow plastic member; and adjustment of the metering member 216 axially relative to the feed opening 212 varies the size of the opening and hence the rate of flow of seeds from hopper 208 into the upper end of tube 204.

The coil windings of the electromagnet E are enclosed by an outer cylindrical casing 234 which is concentric with the tubular conduit 204 and has one end 236 which projects axially beyond the inlet end of the tubular conduit 204 for engagement with the outer surface of the upwardly extending wall 214 of the hopper 208. End 236 of the casing 234 is outwardly flared to better receive the outwardly flared wall 214 of the hopper. An annular end cover member 238 overlies one end of the windings of magnet E adjacent the inlet end of the tubular conduit 204 and extends between the outer casing 234 and the outer surface of tube 204. The end cover 238 is formed with an inner flange 240 engaging the lower end of the mounting portion 210 and defines a support for the hopper mounting portion 210. A similar end cover 242 extends between the lower end of the outer casing 234 and the outer surface of tube 204 for covering the lower end of the windings of the electromagnet E.

The seeds are fed into the upper end of tube 204 and are caused to roll and tumble while in the field of magnet E by the deflecting elements 206 so that each seed assumes a variety of positions relative to the magnetic field as it passes through the magnetic field. As the seeds fall through the tube 204, the baffles 206 interrupt the travel of the seeds through the magnetic field and causes the seeds to bounce back and forth in a tortuous path as they move through tube 204.

In the illustrated embodiment, it is estimated that each seed is in the magnetic field for approximately three seconds during which time the seed is caused to assume numerous positions with respect to the magnetic field.

As the seeds fall through the lower end of tube 204, they are guided by a guide chute 204A (FIG. 3) into the seed metering and dispensing mechanism 26.

In accordance with the present invention it is desired to monitor the seeds falling from the hoppers 12 and 208 past the metering device 216 into the tube 204 in such a manner that the operator receives a signal if the seed flow is interrupted, or if the magnet E is not energized. For example, the power source to the electromagnet E can be controlled by a suitable seed sensor located at or near the upper end of tube 204. When seeds fall past the metering member 216 into tube 204, the sensor responds to cause the electromagnet E to be energized, and at the same time activates a light signal visible to the operator in the tractor or draft vehicle. The light signal will thus indicate to the operator whether the flow of seeds has been interrupted and whether the magnet E is energized.

In accordance with the present invention a microwave transmitter/receiver is utilized to monitor the flow of seeds and energize the electromagnet E in response to the flow of seeds.

Figure 4:
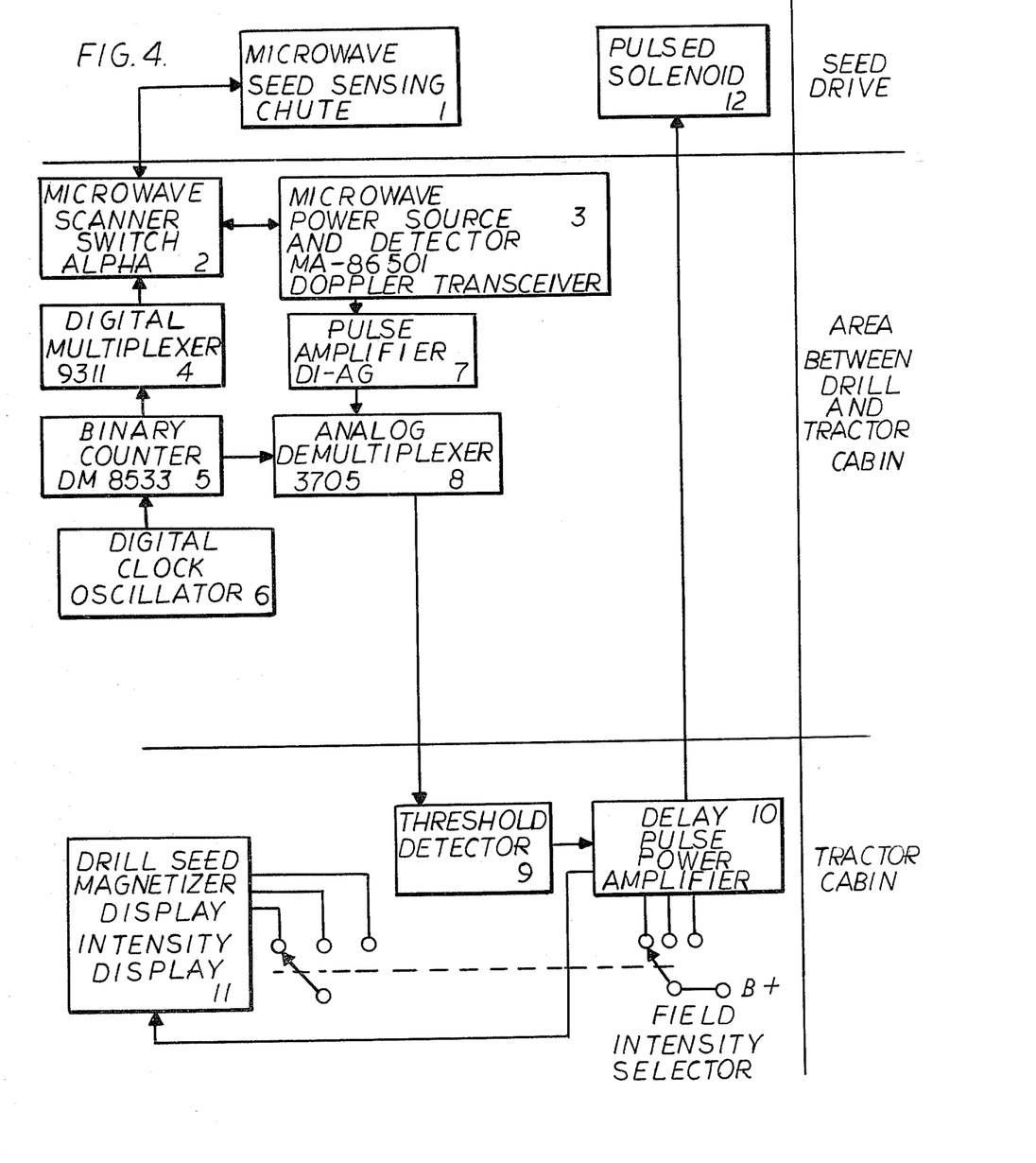
FIG. 4 is a block diagrammatic view of a microwave seed sensing apparatus according to this invention in conjunction with a single row of a seed planter.
Figure 5:
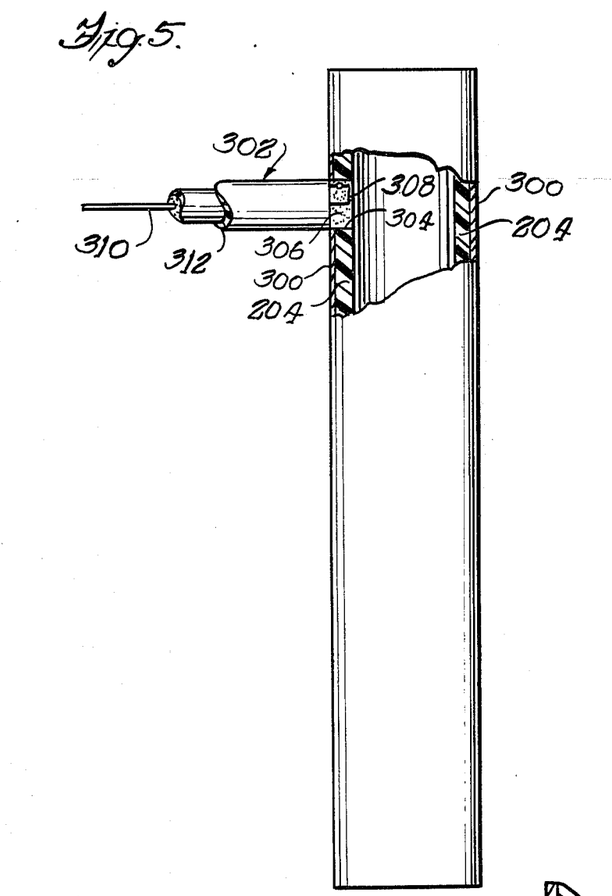
FIG. 5 is an elevational view of a microwave seed sensor in accordance with this invention; and, FIG. 6 is an enlarged view of a portion of the sensor of FIG. 5.
Figure 6:
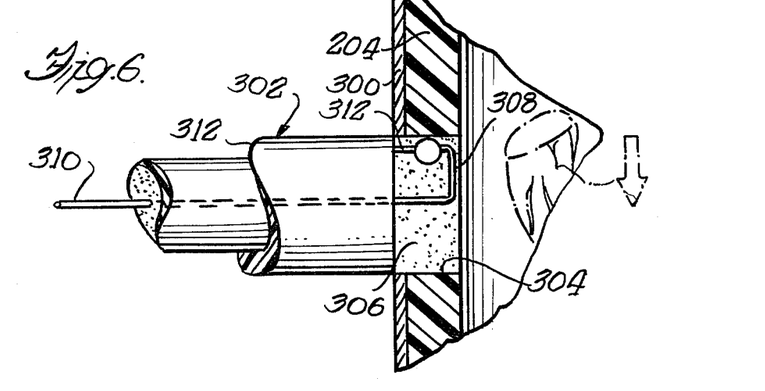

The block diagram of the system of FIG. 4 shows 12 major components that make up the microwave seed sensing system and a suitable circuit for cooperating therewith. They are listed in the sequence that they will be discussed as follows:

Component #1 Microwave Seed Sensor and Sensing Chute
Component #2 Microwave Scanner Switch
Component #3 Microwave Power Source and Detector
Component #4 Digital Multiplexer
Component #5 Binary Counter
Component #6 Digital Clock Oscillator
Component #7 Pulse Amplifier
Component #8 Analog Demuliplexer
Component #9 Threshold Detector
Component #10 Delayed Pulse Power Amplifier
Component #11 Drill Seed Magnetizer Display
Component #12 Pulsed Solenoid Component #1—Microwave Seed Sensor and Sensing Chute The microwave seed sensing chute is best viewed in FIGS. 5 and 6 and generally corresponds to the tubular conduit 204 discussed above. To accommodate the microwave sensing elements of the invention, this tubular conduit 204 is further provided with an external metallic coating 300 preferably of aluminum, for containing microwave energy while avoiding any interference with the action of the electromagnet E. In the illustrated embodiment, this tubular conduit or sensing chute 204 is on the order of seven inches in length, has an inside diameter of on the order of 0.900 inch and outside diameter of on the order of 1.25". The plastic material of conduit 204 is selected for its ability to absorb microwave radiation at 10.5 GHZ. This type of material is available as Eccosorb Microwave Absorbers from the Emerson & Cumming Inc. Canton, Mass. The objectives achieved in using a lossy tube are that by absorption it will minimize the signal returned to the detector during the period when seeds are not present. This enhances the contrast between the signal and its background level and gives the ability to detect seeds more precisely. It also eliminates the need to provide isolators in the microwave scanner switch, which in turn reduces the cost. With sufficient absorbing material, signals reflected from the ground and signals due to seeds further down the tube will be minimized.

An rf coaxial transmission line or cable 302 has its end terminated in a through aperture 304 located on the order of 1.125 inch from the top of the conduit 204. This cable 302 is secured within the aperture 304 with an adhesive 306 having low microwave loss and having a dielectric constant of about 1.2 (relative). The aperture 304 has a diameter of on the order of $\frac{3}{8}$ inch. The adhesive forms a smooth surface on the inside of the conduit 204 so as not to interfere with the passage of seeds therethrough.

Preferably, the cable type is RG 223/U and is double shielded to reduce leakage of microwave power out of the cable. Excessive leakage power could be otherwise reflected back into the cable to introduce signals that could be falsely interpreted as seed signals. The end of the cable 302 going into the aperture 304 has a coupling loop 308 formed using the center conductor 310. This center conductor is looped back, and is soldered to the shield 312 of the cable 302. The other end of the cable 302 is mechanically fastened to one of the eight output ports of a microwave scanner switch 400 (FIG. 4). Microwave power enters the microwave seed sensing chute 204 via the cable 302 from the microwave scanner switch 400.

A seed entering the microwave sensing chute 204 from the hopper 112 must pass through the microwave radiation launched by the loop 308 into the microwave sensing chute. The microwave energy disturbance caused by the presence of the seed is transmitted back into the loop 308 and back up the cable 302 transmission line to the microwave scanner switch 400 from which it came. This returning energy interferes with the transmitted energy within the transmission line in both phase and amplitude, producing a shift in the standing wave pattern all the way back to the microwave power source and detector (component #3 described below) via the microwave scanning switch 400.

Figure 7A:
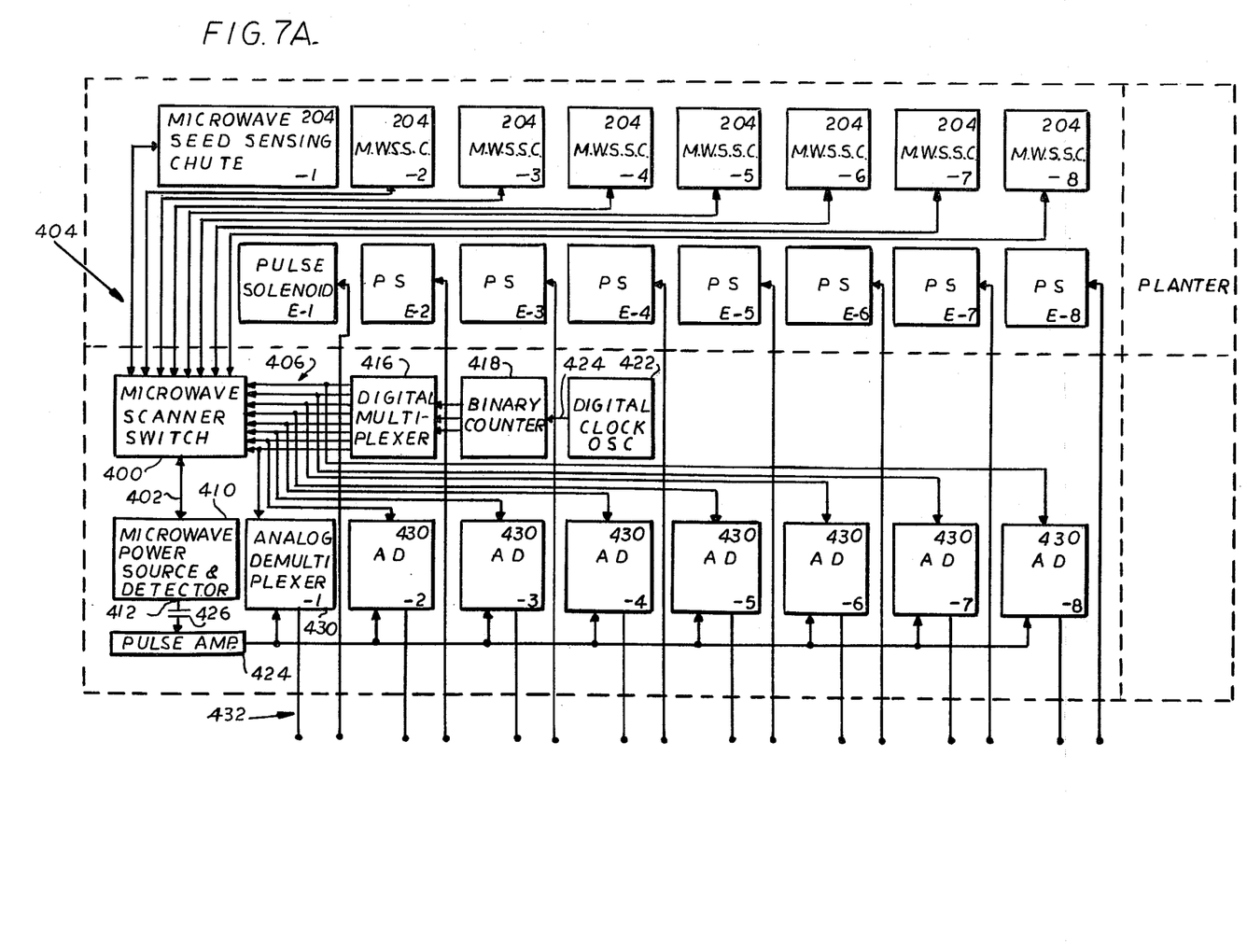
FIGS. 7A and 7B taken together, form a block diagrammatic representation of a circuit associated with the sensor apparatus according to this application embodied in a multiple row planter.
Figure 7B:
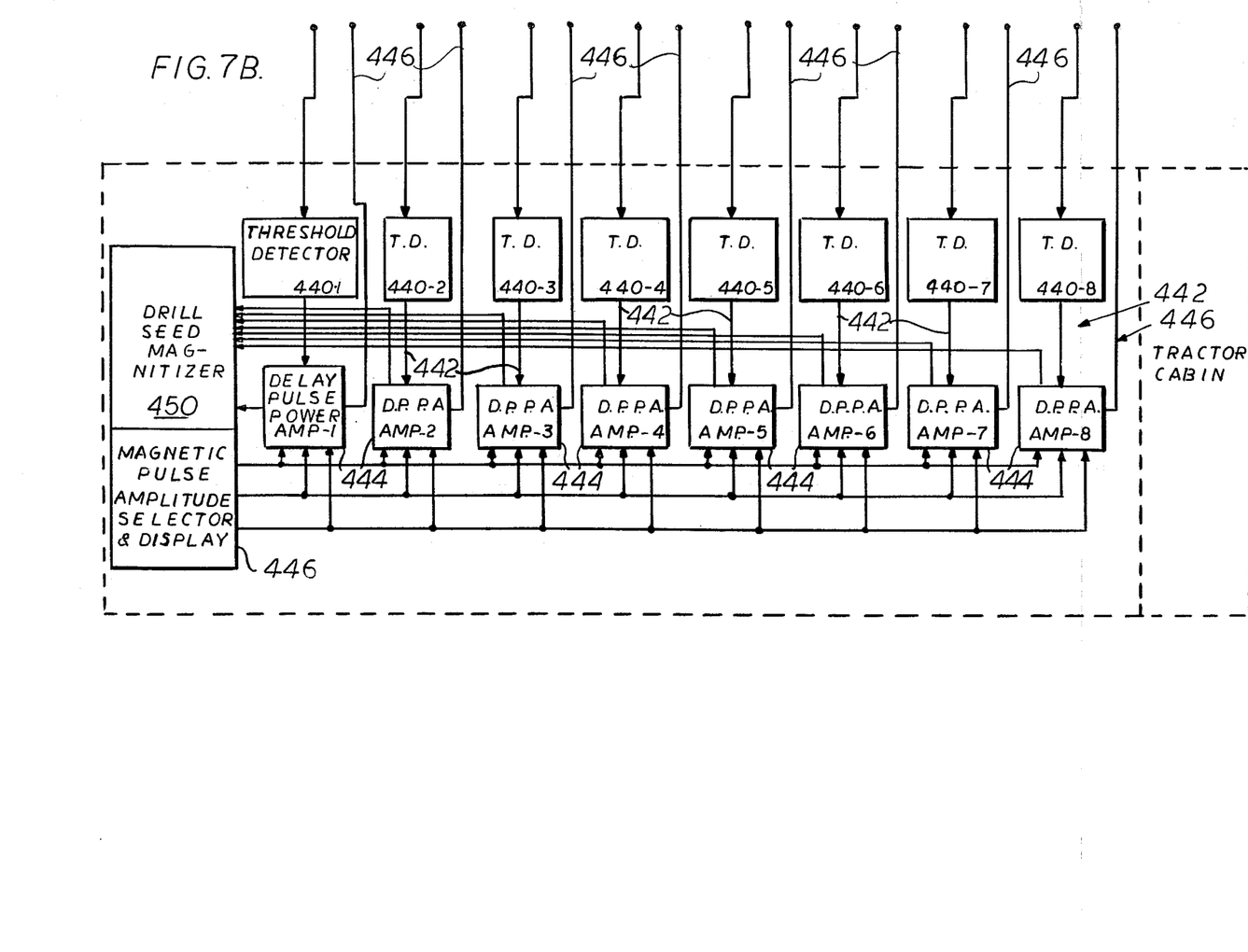

Reference is hereinafter also invited to FIGS. 7A and 7B, which form a diagram of the components of the invention configured to accommodate an eight row seed planter. In FIGS. 7A and 7B the reference numerals are provided with hyphenated additional numerals (i.e. -1, -2, etc.) to indicate the number of the row or seed chute of the planter apparatus with which that particular component is associated. FIG. 4, of course is a block diagram, therefore illustrating each such component only once. It should be recognized, that insofar as circuit elements are illustrated in FIGS. 7A and 7B, and described below, that FIGS. 7A and 7B comprise a complete schematic circuit diagram of a suitable circuit for use with a microwave seed sensor of the invention as described immediately hereinabove. The provision of suitable power supplies, etc. for these circuit components is in accordance with conventional practice and will become immediately apparent from the following descriptions of these components to those skilled in the art.

Component #2 Microwave Scanner Switch

The microwave scanner switch 400 is a device for redirecting microwave power coming into its input port 402 to one of 8 output ports designated generally 404. This switch 400 is designed to reduce the power reflected back into the power source when the switch is placed in the transmission line, reduce the absorption of power in the process of traveling through the switch, minimize the leakage of power out of ports that are switched off, maximize the speed with which ports can be switched on and off and reduce the effects of ringing when the switch power is turned on and off. The data sheet describing these switches is distributed by Alpha Industries, Inc. 20 Sylvan Road, Woburn, Mass. It is titled Single Pole Multi Throw Switches MT3653 to MT3657. The switch operates by the use of semiconductor diodes in each of 8 output ports. When the diodes are conducting because of applied forward bias they complete a microwave circuit to an output port. When the diode is non-conducting due to the absence of bias the port does not pass microwave power. The 8 diodes switch matrices in the 8 ports require digital steering or switching signals to be applied to 8 wires 406 entering the microwave scanning switch 400. There are therefore 8 outputs 404 for microwave power, 1 input 402 for microwave power and 8 wires 406 to receive digital switching signals.

The microwave power input 402 receives power from the microwave power source and detector (component #3, described below). Each of 8 microwave power output ports 404 directs microwave power to one of 8 separate microwave sensing chutes 204.

The 8 wires 406 that receive digital switching signals receive these signals from a digital multiplexer (component #4, described below). These signals consist of a 125 microsecond logic 0 pulse given in time sequence to each of the 8 wires 406. Wires 406 not receiving the logic 0, 125 microsecond pulse receive logic 1. Thus each switch wire 406 receives a logic 0 pulse 1000 times/second. One cycle, in which every switch wire 406 receives a logic 0 pulse in sequence, takes place in 1 millisecond.

Component #3 Microwave Power Source and Detector

The presence of a seed is detected as a disturbance by the seed of electromagnetic radiated energy. The wavelength of this energy is 2.85 centimeters, corresponding to a frequency of 10.5 Gigahertz. (The wave lengths of visible light are from 0.00007 to 0.0004 centimeters.) The 2.85 centimeter wavelength has been allocated by the FCC for industrial applications. Semiconductor devices are readily available that emit radiation at 2.85 centimeters at low cost. The "Gunn Oscillator" diode is one of these semiconductor devices.

The microwave power source and detector 410 is an assembly that includes a Gunn Oscillator source of radiation at 2.85 centimeters. The assembly also includes a detector for 2.85 centimeter radiation. The data that deals with this assembly is distributed by the manufacturer, Microwave Associates Inc. Burlingtion, Mass., titled Bulletin 7014A, Ma - 86501 Doppler Transceiver.

The output of the microwave power source and detector 410 is fed to the input 402 of the microwave scanner switch 400, which in turn directs this power to one of 8 microwave seed sensing chutes 204, dwelling for 125 microseconds on each chute, 1000 times/second. The power variation from a seed disturbance during the dwell time at a microwave seed sensing chute 204, passes back through the switch 400 into the microwave power source 410 detector and produces a voltage at a video output line 412 of this device. This voltage is passed on to the pulse amplifier (component #7, described below). The Gunn Oscillator delivers about 10 milliwatts and is biased with 7.5 volts.

Component #4 Digital Multiplexer

This component, designated 416, is a digital integrated circuit producing a complex function at its output. A typical unit of this type is the Motorola MC 4038P Inverting/Noninverting one-of-Eight Decoder. This type of unit is also manufactured by others such as Fairchild, Advanced Micro and National Semiconductor.

The multiplexer 416 feeds the 8 wire leads 406 and has three control leads 418 that receive timing signals. These timing signals are fed to the three leads 418 from the 4 bit binary counter (Component #5, described below). These timing signals comprise a count from 1 to 8 in binary code. Following the 8th count, the count is repeated continuously.

Accordingly, the output function on the 8 leads 406 is as follows: during the first 125 microseconds, 7 leads produce a logic level of logic 1, lead #1, however, produces a level of logic 0. This activates power transmission through the #1 channel of the microwave scanning switch. All other channels of the microwave scanning switch are deactivated by the logic 1 signal on the other wires 406. During the succeeding 125 microseconds lead #1 changes to a logic 1 and lead #2 drops to a logic 0. All others remaining at logic 1. During the third interval of 125 microseconds, lead #3 changes to logic 0, all other take logic 1. This process continues until all leads receive the logic 0 period and then the cycle is repeated starting from lead #1 again.

Component #5 Binary Counter

This component 420 is a digital integrated circuit providing the binary coded count described above. A typical unit is the Motorola Presettable 4-bit Binary Counter MC8316L. This type of unit is also available from other manufacturers. The input to this unit is the continuous pulse train produced by the digital clock oscillator (Component #6 described below).

Component #6 Digital Clock Oscillator

This component 422 is a digital integrated circuit producing a continuous pulse train at its output 424. A typical unit is the Motorola MC4024P Dual Voltage Controlled Multivibrator. This is also available from other manufacturers. Its function is to supply a periodic square wave to the input of the binary counter 420. Resistors and capacitors are added to the unit in conventional fashion to select the frequency of operation. Alteration of a control voltage can also change its operating frequency. In this apparatus the frequency is adjusted for 8000 HZ. The technique for setting this frequency is well known in the art and need not be described further herein. This frequency is the "clock frequency" of the system.

Component #7 Pulse Amplifier

This component 424 is a complex linear integrated circuit. It is a high performance operational amplifier system. Its function is to accept the signals produced by the detector in the microwave power source and detector 410, to amplify this signal faithfully and to provide means whereby wanted signals are isolated from unwanted signals. This amplifier unit 424 may be, for example, a Fairchild UA748TC. The amplifier input 424 is AC coupled at its input from line 412 by a low leakage capacitor 426 to prevent the amplification of the large direct current signal that exists on the output of the microwave power source and detector. The upper portion of its frequency response is limited to reduce the noise bandwidth and thus improve signal to receiver noise ratio. The lower portion of its frequency response is limited to discriminate against the 1/f electrical noise normally present in microwave video detectors. The output voltage of the operational amplifier is given to the input of the analog demultiplexer.

Component #8 Analog Demultiplexer

This component "unscrambles" the time sharing of reflected power due to seeds among the eight microwave chutes 204. The analog demultiplexer utilized in the illustrated embodiment consists of 8 sample and hold units 430 of the type manufactured by National Semiconductor classified as LF398H Sample and Hold. The "unscrambling" of the time sequence is not difficult since this unit receives its control for timing from the same source (the digital multiplexer 416) that controls the timing of the microwave scanner switch 400. In other words, when the digital multiplexer commands the #1 channel of the power scanner switch to direct power to #1 microwave sensing chute 204 it also commands #1 sample and hold 430 to store the signal received via pulse amp 424 during the same time. The output of the pulse amplifier 424 (one component) feeds all 8 sample and holds simultaneously. The digital multiplexer gates only one sample and hold on at a time to store the signal available during that time. 8 Output wires 432 are fed from the analog multiplexer, one for each sample and hold 430 to the input of one of 8 threshold detectors. The signal on each of these wires is a voltage that remains constant in magnitude except during the time when a seed traverses the electromagnetic field in the microwave chute.

Component #9 Threshold Detector

The threshold detectors 440 are sensitive to the change in amplitude of the voltage on the output wires 432 of the sample and holds 430. There are 8 threshold detectors 440, one for each microwave sensing chute. Channel #1 sample and hold feeds as an input channel #1 threshold detector etc. The type of unit which may be used as the threshold detector 440 is a linear integrated circuit called a comparator such as Motorola types MC1711CF, MC1711CG or MC3302P. Each circuit 440 provides a change in logic level on its output 442 determined by the presence of a change in the output voltage of the analog demultiplexer. The leading edge of the change in logic level then initiates the delay timing sequence for pulsing the pulse solenoid. There are 8 output wires 442 one for each threshold detector—connected to 8 inputs of 8 delayed pulse power amplifiers.

Component #10 Delayed Pulse Power Amplifier

These circuits 444 form a delayed pulse to compensate for the transit time occurring between sensing of the seed and the seed entering the south pole edge of the pulsed solenoid (i.e. electromagnet E). They also initiate the magnetizing pulse and provide a means to adjust its amplitude.

A unit suitable for this function is a complex digital integrated circuit manufactured by Fairchild (and other mfgrs.) such as type 74123DC TTL/SS Dual Retriggerable one shot. There are also other useful types. The output of the 74123DC feeds a conventional power amplifier (not shown). The output of the power amplifier can be adjusted for 3 output amplitudes by means of a conventional resistance divider represented diagrammatically as "Magnetic Pulse Amplitude selector/display" 446. This adjustment is available to the operator. The adjustable outputs 446 each carry a 24 millisecond pulse fed to the pulse solenoid.

There are two one shots in each 74123DC package. The first one shot produces a pulse of 56 milliseconds. Its trailing edge triggers the second one shot which produces a pulse of 24 milliseconds. Eight delayed pulse power amplifiers feed 8 pulsed solenoids.

Component #11 Drill Seed Magnetizer Display

This unit 450 is located on the tractor console to be clearly visible to the operator of the system. The display having the least expense is one using LED (light emitting diodes). However, alternate sources of light radiation may be used.

There are 8 LED lights, one for each seed sensing chute 204. Each light receives its driving pulse from the output of the corresponding delayed pulse amplifier 444. A pulse to the pulse solenoid (E) also means a pulse to the corresponding LED light.

Component #12 Pulsed Solenoid

A pulsed solenoid as best seen in FIG. 2 is located on each microwave sensing chute 204. It is preferably wrapped around the tube. In the illustrated embodiment, the solenoid size is: length 1½ inch, outside diameter 2 inches, inside diameter 1 inch. The location of the edge of the solenoid south pole is on the order of ½ inch below the point of the microwave launching loop. Calculations for magnetic field intensity were derived from the text by Stephen S. Atwood titled, Electric and Magnetic Fields, John Wiley & Sons, Inc. page 231., equation 387 for the long solenoid.

$$H = 4\pi \, ni/s \text{ Gilberts/Centimeter}$$

Since the pulse solenoid requires a 24 millisecond pulse every 56 milliseconds under its most adverse conditions it must have a fast response time to developing the designed magnetic field intensity both in turning on and also in turning off. The response time of the solenoid has the relationship $T = L/R$, where L is the inductance of the coil and R is its resistance. T should be of the order of 1 millisecond.

The inductance of the coil was calculated using the formulas given by Radio Engineers Handbook author—Frederick Emmons Terman ScD McGraw-Hill Book Company, Inc.

$$L_o = Fn^2 d - 0.313 n^2 ac/b(0.643 + B_s) \text{ Microhenries}$$

In operation the microwave seed sensor according to the present invention detects the presence of a seed such as corn seed through the use of the seed's disturbance of a microwave field that exists in the path of the travel of the seed. The disturbance in the field causes a variation in the microwave energy which is carried back through the microwave system where it is detected as an electrical signal variation. This electrical signal variation is converted to a suitable signal or pulse. This pulse is fed as a control pulse to control energization of the solenoid, somewhat delayed from the instant of seed detection to permit the seed to travel in its flight path to the south pole edge of the solenoid. The leading edge of the magnetizing pulse is thus made to occur simultaneously with the entrance of the seed into the south pole of the magnet (its edge). The length of the magnetizing pulse is made equivalent to the time of flight of the seed moving between the south pole edge of the solenoid and the center of the solenoid. The solenoid remains off during the period of the seeds flight between the center of the solenoid and about an inch in the fligh path beyond the north pole edge of the solenoid. A control on the display permits the operator to select 3 different magnetic field intensities that can be supplied to the solenoid in between 75 and 200 gauss.

The control pulse that is applied to control energization of the solenoid is also applied to control energization of a light on the display. This light is marked to identify it with the seed drill or chute whose solenoid is being magnetized.

Advantageously the apparatus disclosed employs every possible opportunity to time share components. This has been done in order to reduce the multiplicity of components needed to monitor 8 or more seed drills connected with a seed planter. In order to do this, switching of the seed illuminating signal has been employed at a rate of 1000 cycles per second with illuminating pulses lasting 125 microseconds. These are switching rates not presently possible with mechanical or photosensitive types of seed sensors.

In operation, then, the microwave energy or signal is switched to each drill 1000 times/second. The microwave signal dwells at each one of eight drills for 125 microseconds. During the 125 microsecond dwell of the microwave signal at one drill a field disturbance from a seed can pass back to the microwave detector, be amplified and the level of detection stored. One millisecond will elapse before the same drill is energized once more. The resulting signal amplitude is again stored. The cumulative stored amplitude is then compared (at circuits 430) with the amplitude produced when a seed is not present and if a given variation is found, a timing pulse is generated to indicate the presence of a seed at the microwave sensor. Signals are stored in the 8 seed threshold detectors 442 corresponding to the sensing of 8 seed drills. Each seed threshold detector 442 independently produces a fixed delay pulse following the detection of the presence of a seed. In the embodiment illustrated, the time delay of the delay pulse is 56 milliseconds. This is the time necessary for the seed to travel to the edge of the solenoid magnet. At the termination of the fixed delay pulse a fixed length magnetizing pulse is generated. This pulse lasts for 24 milliseconds and corresponds to the time necessary for the seed to pass from the edge of the south pole of the solenoid magnet to the middle of the magnet. The magnetizing pulse remains off until the next seed is detected. When the tractor moves at 6 miles per hour and seeds are planted 6 inches apart the time in between seeds dropped is 56 milliseconds. If the tractor moves slower the time in between seed drops becomes longer. When the tractor moves at 6 miles/hour the seed has fallen about 1 inch below the north pole of the 1½ inch long solenoid magnet before the magnet is pulsed on again. When the tractor moves slower the seed is displaced further from the north pole before the magnet is again turned on.

While specific forms of the invention have been illustrated and described in the foregoing specification and accompanying drawings, it should be understood that the invention is not limited to the exact construction shown. Alterations in the construction and arrangements of parts, all falling within the scope and spirit of the invention, will be apparent to those skilled in the art.

The invention is claimed as follows:

1. In a seed planter including a seed hopper for containing a supply of seeds, said seed hopper having a seed outlet, seed delivery means connected with said seed outlet for delivering seeds therefrom to the ground to be planted, and means connected with said seed delivery means for sensing seeds being delivered thereby and providing signal means in response thereto, wherein said last-mentioned means comprise: means forming a confined path of travel for seeds, a source of microwave energy positioned for directing microwave energy in said confined path of travel for seeds, means for substantially confining microwave energy to a predetermined portion of said confined path of travel and said microwave source including microwave detector means for detecting a disturbance in said microwave energy due to the passage of a seed along said predetermined portion of said confined path of travel to provide said signal means.

2. A seed planter according to claim 1 further including means connected with said microwave detector means and responsive to said signal means therefrom for providing an indication to an operator of said planter of the detection of seeds by said detector means.

3. A seed planter according to claim 1 further including means adjacent with a further portion of said confined path of travel and selectively actuatable for magnetically treating said seeds, and control means connected between said last-mentioned means and said sensing means and responsive to said signal means for selectively actuating said magnetic treating means.

4. In a seed planter according to claim 1 wherein said seed delivery means comprises a plurality of seed dispensing mechanisms for simultaneously planting a plurality of rows of seeds and further including means forming a corresponding plurality of confined paths of travel for seeds, and wherein said source of microwave energy comprises a microwave power generator and an electronically controllable microwave scanner switch for redirecting microwave energy from said generator to each of said confined paths of travel.

5. In a seed planter according to claim 4 further including electronic control circuit means including multiplexer means connected for controlling said microwave scanner switch for sequentially and repeatedly redirecting said microwave power to each of said confined paths of travel in a predetermined sequence and demultiplexer means operated in said predetermined sequence simultaneously with said multiplexer means for receiving said signal means from said microwave detector means and for providing an indication to an operator of said planter of the detection of seeds along each of said confined paths of travel in accordance with said signal means.

6. In a seed planter according to claim 5, wherein said microwave detector means is positioned at said microwave power generator for receiving microwave energy returned through said microwave scanner switch due to the passage of a seed along said confined path of travel.

7. In a seed planter, the combination comprising: a seed hopper for containing a supply of seeds and having a seed outlet; seed delivery means connected with said seed outlet for delivering seeds to the ground to be planted; magnetic seed treatment means including means forming a confined path of travel for seeds prior to delivery thereof to the ground to be planted, and means selectively energizable for producing a magnetic field in a predetermined portion of said confined path of travel for inducing magnetism in said seeds; and control means, including microwave detector means, operable in response to movement of seeds along a portion of said confined path of travel prior to said predetermined portion, for energizing said magnetic field producing means.

8. A combination according to claim 7 wherein said control means includes control circuit means responsive to said microwave detector means for energizing said magnetic field producing means for a predetermined period of time corresponding to the time during which seeds travel through said predetermined portion of said confined path of travel.

9. A combination according to claim 7 wherein said magnetic field producing means comprises an electromagnet.

10. A combination according to claim 7 wherein said seed dispensing means comprises a plurality of seed dispensing mechanisms for simultaneously planting a corresponding plurality of rows of seeds, and said means forming a confined path of travel comprises a plurality of seed-carrying conduits, one of said conduits being associated with each of said seed dispensing mechanism.

* * * * *